United States Patent
Hirai et al.

(10) Patent No.: US 7,413,717 B2
(45) Date of Patent: Aug. 19, 2008

(54) CERAMIC HONEYCOMB STRUCTURAL BODY AND METHOD OF MANUFACTURING THE STRUCTURAL BODY

(75) Inventors: Sadaaki Hirai, Nagoya (JP); Takayuki Kawae, Nagoya (JP); Yasushi Kato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 571 days.

(21) Appl. No.: 10/506,184

(22) PCT Filed: Feb. 25, 2003

(86) PCT No.: PCT/JP03/02055

§ 371 (c)(1), (2), (4) Date: Aug. 31, 2004

(87) PCT Pub. No.: WO03/078121

PCT Pub. Date: Sep. 25, 2003

(65) Prior Publication Data

US 2005/0106083 A1 May 19, 2005

(30) Foreign Application Priority Data

Mar. 15, 2002 (JP) .............................. 2002-072488
Jan. 9, 2003 (JP) .............................. 2003-002960

(51) Int. Cl.
*F01N 3/00* (2006.01)
*B01D 53/34* (2006.01)

(52) U.S. Cl. .................. 422/180; 422/177; 422/168

(58) Field of Classification Search ................ 422/180, 422/177, 168
See application file for complete search history.

(56) References Cited

U.S. PATENT DOCUMENTS

| | | | |
|---|---|---|---|
| 4,233,351 A | 11/1980 | Okumura et al. | |
| 4,255,316 A | 3/1981 | Blizzard | |
| 4,416,675 A * | 11/1983 | Montierth | 55/502 |
| 4,455,336 A * | 6/1984 | Ogawa et al. | 428/116 |
| 5,487,863 A * | 1/1996 | Cunningham et al. | 264/177.11 |
| 5,750,026 A * | 5/1998 | Gadkaree et al. | 210/502.1 |
| 5,952,079 A * | 9/1999 | Andou et al. | 428/116 |
| 6,040,266 A * | 3/2000 | Fay et al. | 502/439 |
| 6,217,832 B1 * | 4/2001 | Betta et al. | 422/179 |
| 6,242,072 B1 | 6/2001 | Ueda et al. | |
| 2001/0003728 A1 | 6/2001 | Ito et al. | |
| 2001/0006717 A1 * | 7/2001 | Domesle et al. | 428/116 |
| 2002/0022109 A1 | 2/2002 | Ichikawa et al. | |
| 2002/0044683 A1 * | 4/2002 | Deshpande et al. | 382/165 |

FOREIGN PATENT DOCUMENTS

EP 1 106 589 A2 6/2001

(Continued)

*Primary Examiner*—Walter D. Griffin
*Assistant Examiner*—Natasha Young
(74) *Attorney, Agent, or Firm*—Oliff & Berridge, PLC (57) ABSTRACT

The ceramic honeycomb structure according to the present invention includes a cell group having a plurality of cells which are divided each other by porous partition walls and functioning as a fluid channel, and porous outer wall surrounding and holding outermost peripheral cells located at a circumference of the cell group. In the partition walls, a part located at least one opening end of the cells of the cell group constitutes a reinforced partition wall part having higher strength than the other part of the partition walls (normal partition wall part) as well as having a variation of porosity per unit volume within ±2%. Uniform and excellent erosion resistance is achieved throughout the reinforced partition wall part.

12 Claims, 6 Drawing Sheets

FOREIGN PATENT DOCUMENTS

| | | |
|---|---|---|
| FR | 2 455 074 A | 11/1980 |
| JP | A 55-99344 | 7/1980 |
| JP | A 4-293550 | 10/1992 |
| JP | A 8-224720 | 9/1996 |
| JP | A 2000-051710 | 2/2000 |
| JP | A 2000-237600 | 9/2000 |
| JP | A 2001-220245 | 8/2001 |
| JP | A 2001-226173 | 8/2001 |
| JP | A 2002-70545 | 3/2002 |

* cited by examiner

CERAMIC HONEYCOMB STRUCTURAL BODY AND METHOD OF MANUFACTURING THE STRUCTURAL BODY

TECHNICAL FIELD

The present invention relates to a ceramic honeycomb structure and a method of producing the same, and more specifically to a ceramic honeycomb structure which is suited for a carrier for controlling exhaust gas emission of automobile, ensuring a good balance between emission control performance and durability and canning property of end face, and a method of producing the same.

BACKGROUND ART

In ceramic honeycomb structural bodies widely used as a catalyst carrier and the like for emission control of exhaust gas, there is an increased need for improved emission control performance in order to comply with the emission regulations that have been tightened year by year, while reducing the pressure loss for satisfying the requests for fuel economy and high output.

In such circumstances, the growing trend is to increase the porosity at an opening end of cells of the honeycomb structure by further reducing the thickness of partition walls of the honeycomb structure, thereby reducing the pressure loss, as well as to increase the emission control performance by ensuring immediate activation of the catalyst after startup of the engine by reducing the heat capacity of the partition walls.

On the other hand, the development of such honeycomb structure having thinner walls raised the new problem that a variety of contaminants having entered the exhaust gas collide with the partition walls located at opening ends of cells of the honeycomb structure to damage the partition wall. This phenomenon is known as a erosion phenomenon.

To address this problem, already proposed is a honeycomb structure wherein a partition wall reinforcing part (reinforced partition wall part) having higher strength than the remaining part of the partition walls is provided in partition walls located at an opening end of cells (See Patent document 1, for example), and in this proposal, the manner of providing the partition wall reinforcing part is widely studied.

One conventionally known method of providing a partition wall reinforcing part includes the steps of: firing a base material having a honeycomb structure based on a cordierite forming raw material; adhering a slurry in which a cordierite forming raw material is dispersed in a dispersing medium, to the partition walls located at an opening end of cells of the base material; and drying and firing the resultant base material (See Patent document 1, for example).

However, in this method, the time-consuming firing process must be conducted twice, namely, firing of the base material and firing for providing the partition wall reinforcing part, so that there is still a great problem regarding the production efficiency, product cost and the like.

To address this problem, also suggested is a method in which a slurry prepared by dispersing a partition wall reinforcing material in a dispersing medium is caused to adhere to the partition walls located at an opening end of the cells before the base material having a honeycomb structure is fired, and then drying and firing were conducted. This method accomplishes firing of the base material and formation of the partition wall reinforcing part by a single firing step (See Patent document 1, for example).

However, as to this method, no substantial study about the difference in a material composition between the base material before firing and the base material after firing has been made at the moment. In particular, the base material before firing usually contains an organic binder or the like added for the purpose of, for example, improving the strength of the partition walls, however, no consideration was made on the fact that the organic binder is often a water-soluble compound such as methyl cellulose.

For this reason, if the step of forming a partition wall reinforcing part that is conventionally conducted after the firing step is carried out as it is before firing using a slurry prepared by dispersing the partition wall reinforcing material in water, the organic binder liquates out in the slurry to cause deformation in the partition walls and the like of the obtained honeycomb structure, making it unendurable to practical use due to reduction of isostatic strength or the like.

Additionally, in the case of the slurry prepared by dispersing a partition wall reinforcing material in a dispersing medium, dispersivity of the partition wall reinforcing material is likely to be insufficient because of sedimentation or aggregation of the partition wall reinforcing material caused by its physical property. This often results in variation or unevenness in the partition wall reinforcing part in degree of reinforcement. Accordingly, this production method suffers from the problem of impossibility to reliably obtain a ceramic honeycomb structure having uniform erosion resistance throughout the partition wall reinforcing part or the problem of increase in management burden for uniformly dispersing the partition wall reinforcing material.

To the contrary, the problem such as decrease in isostatic strength due to deformation of the partition wall or the like can be overcome by using a slurry prepared by dispersing the partition wall reinforcing material in a non-aqueous dispersing medium.

However, the problem of impossibility to reliably obtain a ceramic honeycomb structure having uniform erosion resistance throughout the partition wall reinforcing part or the problem of increase in management burden for uniformly dispersing the partition wall reinforcing material is not solved at all in this production method.

(Patent Document 1)

Japanese Unexamined Patent Publication JP-A 2000-51710

The present invention was devised in consideration of the above problems of the prior art, and it is an object of the invention to provide a ceramic honeycomb structure having uniform and excellent erosion resistance throughout the reinforced partition wall part, and a method of producing a ceramic honeycomb structure capable of obtaining a honeycomb structure having desired performance without causing deformation or the like in the partition walls while dramatically improving the productivity and the product cost, as well as forming a sophisticated and uniform reinforced partition wall part with high accuracy.

DISCLOSURE OF THE PRESENT INVENTION

The inventors of the present invention have diligently studied considering the aforementioned problems, and found that by using as a partition wall reinforcing agent, a material based on a compound having at least one kind of atom selected from the group consisting of Si, Ti, Mg and Al in its structure, such as silicone oil, the aforementioned problems can be solved, which accomplished the present invention.

That is, according to the present invention, there is provided a ceramic honeycomb structure comprising: a cell group having cells, the cells being divided each other by porous partition walls and functioning as a fluid channel; and a porous outer wall surrounding and holding outermost peripheral cells located at a circumference of the cell group, wherein in the partition walls, a part located at least one opening end of the cells of the cell group is a reinforced partition wall part having higher strength than the other part of the partition walls as well as having a variation of a porosity per unit volume within ±2%.

In the present invention, it is preferred that the value of porosity (%) of the reinforced partition wall part is smaller than the value of porosity (%) of the normal partition wall part by 3 (%) or more. In the present invention, it is preferred that the porosity of the reinforced partition wall part is not more than 30%.

In the present invention, preferably, the minimum wall thickness of the partition walls is in the range of 0.030 to 0.076 mm, and the length from the end face of the opening end of the cells to the tip end of the reinforced partition wall part is not uniform throughout the reinforced partition wall part.

In the present invention, it is preferred that the thickness of the partition walls of the reinforced partition wall part is larger than the thickness of the partition walls of the normal partition wall part.

In the present invention, taking the outermost peripheral cell as a starting cell, taking any cell of the third to the twentieth cell located inwardly from the starting cell as an end cell and taking cells located inwardly from the end cell as basic cells, it is preferred that a relation between thickness (Tc) of partition walls forming the basic cells and each thickness (Tr1, Tr3-20) of partition walls forming the starting cell and the end cell is $1.10 \leq (Tr1, Tr3-20)/Tc \leq 3.00$.

In the present invention, the ceramic honeycomb structure is preferably formed of at least one kind of ceramic selected from the group consisting of cordierite, alumina, mullite, silicon nitride, aluminum titanate, zirconia and silicon carbide.

In the present invention, a sectional shape of the honeycomb structure perpendicular to the channel is preferably circular, elliptic, oval, trapezoidal, triangular, tetragonal, hexagonal or asymmetric, and a sectional shape of the cell perpendicular to the channel is preferably triangular, tetragonal or hexagonal.

The ceramic honeycomb structure of the present invention is preferably used as a carrier for catalyst for purification of automobile exhaust gas. It is also preferred that a catalyst component is loaded on the partition walls of the honeycomb structure, which is assembled into a catalytic converter, and held at the outer surface of the outer wall.

Furthermore, according to the present invention, there is provided a method of producing a ceramic honeycomb structure including the steps of obtaining a base material which is a dry body of honeycomb structure having a plurality of partition walls using a kneaded compound based on a ceramic material, adhering a partition wall reinforcing agent to the part of the partition walls located at least one of the opening ends of the cells in the base material, and firing the resultant base material, wherein as the partition wall reinforcing agent, a material based on a compound having at least one kind of atom selected from the group consisting of Si, Ti, Mg and Al in its structure is used.

In the present invention, the partition wall reinforcing agent is preferably based on a compound generating an inorganic oxide upon firing, and more preferably a compound having a siloxane bond. To be more specific, a partition wall reinforcing agent based on silicone oil, silicone varnish, alkoxy oligomer or a mixture thereof is preferred.

Preferably, the partition wall reinforcing agent has an absolute viscosity of 1 to 10000 mPa·s and is based on a compound having such an absolute viscosity.

In the present invention, a variety of materials can be used as a ceramic material, and it is preferred to select the kind of the partition wall reinforcing agent in accordance with the kind of the ceramic material. For example, when a cordierite forming raw material is used, compounds having Si in their structures such as silicone oil are preferred.

Furthermore, in the present invention, when a water-soluble organic binder is contained in the kneaded compound in addition to the ceramic material which is the basis, the effect thereof is especially large. Concrete examples of the water-soluble organic binder include those comprising at least one kind of water-soluble compound selected from the group consisting of hydroxypropylmethyl cellulose, methylcellulose, hydroxyethyl cellulose, carboxymethyl cellulose, polyvinyl alcohol and polyvinyl acetal.

BRIEF DESCRIPTION OF THE DRAWINGS

FIG. 5 are explanatory views schematically showing an embodiment of the ceramic honeycomb structure of the present invention. FIG. 5(*a*) is a perspective view, FIG. 5(*b*) is a plane view and FIG. 5(*c*) is a side view.

BEST MODE FOR CARRYING OUT THE INVENTION

The present invention will be described below more specifically. However, the present invention is in no way restricted to the embodiments described below. The ceramic honeycomb structure according to the present invention is a ceramic honeycomb structure comprising a cell group consisting of a plurality of cells which are divided each other by porous partition walls and functions as a fluid channel and a porous outer wall surrounding and holding outermost peripheral cells located at a circumference of the cell group, wherein in the partition walls, a part located at least one opening end of the cells of the cell group is a reinforced partition wall part having higher strength than the part other than the part located at least one opening end of the cells (hereinafter, referred to as "normal partition wall part") as well as having a variation of a porosity per unit volume (hereinafter, referred to as "maximum difference in porosity") within ±2%. Next, detailed explanation thereof will be provided.

Figure 5A:
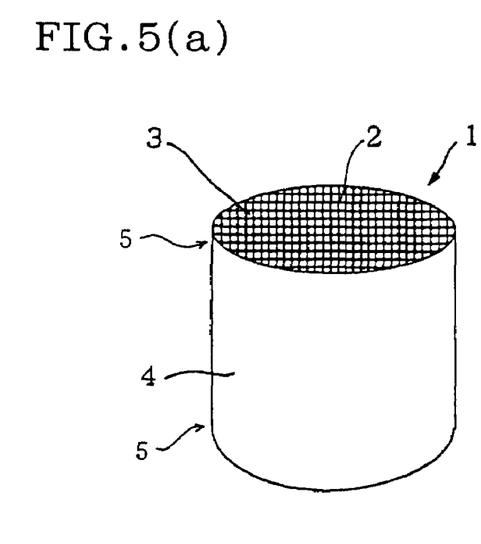
Figure 5B:
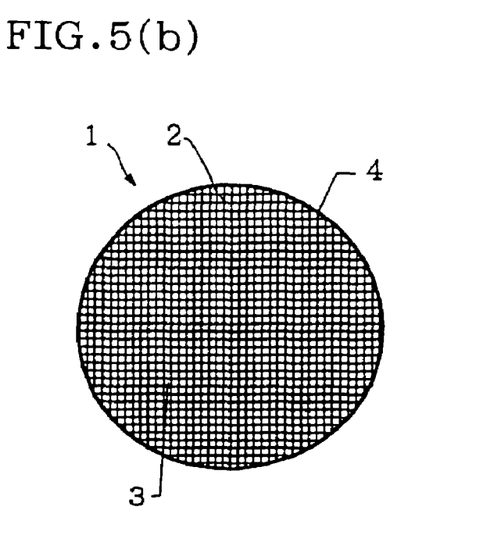
Figure 5C:
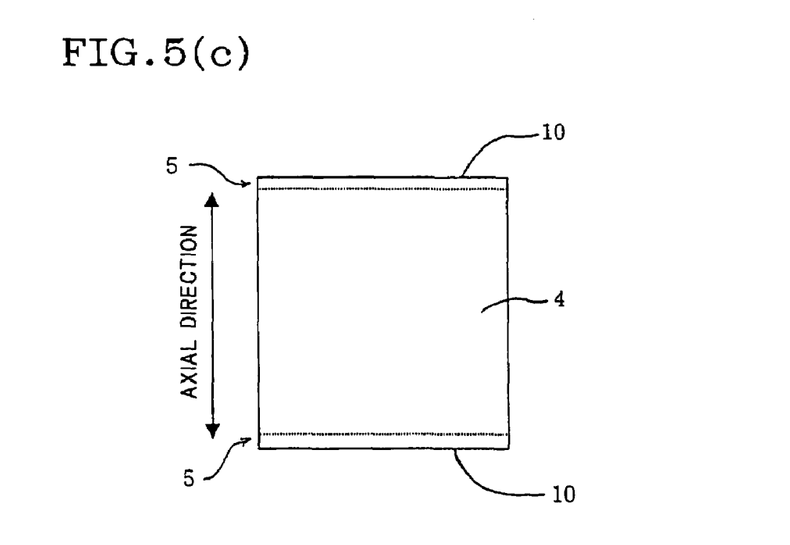
Figure 6:
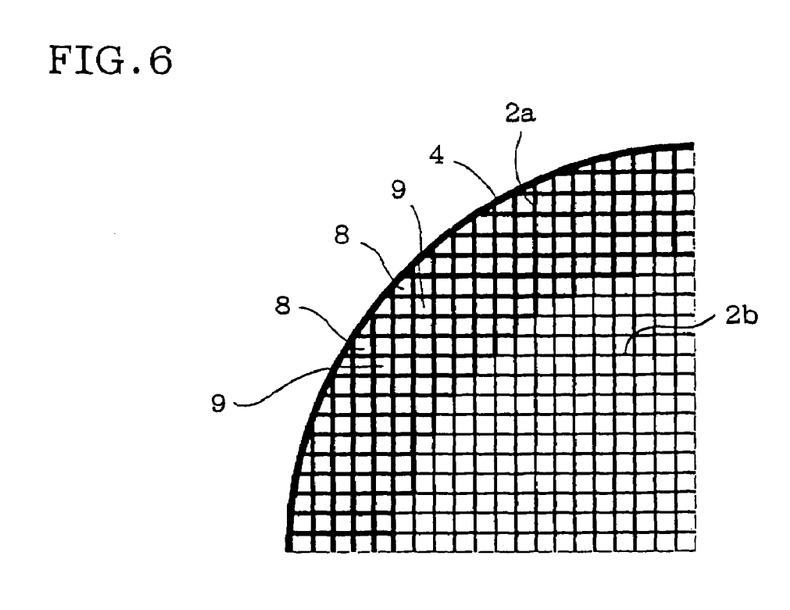
FIG. 6 is a partially enlarged view schematically showing another embodiment of the present invention.

FIG. 5 are explanatory views schematically showing an embodiment of the ceramic honeycomb structure of the present invention. FIG. 5(*a*) is a perspective view, FIG. 5(*b*) is a plane view and FIG. 5(*c*) is a side view. FIG. 6 is a partially enlarged view schematically showing another embodiment of the present invention. A ceramic honeycomb structure 1 has a cell group consisting of a plurality of cells 3 which are divided each other by a plurality of porous partition walls (cell partition walls 2) and functioning as a fluid channel and a porous outer wall 4 surrounding and holding outermost peripheral cells 8 located at a circumference of the cell group. In FIG. 6, the reference numeral 2*a* represents a peripheral cell partition wall, the reference numeral 2*b* represents a basic cell partition wall and the reference numeral 9 represents a second cell from the circumference of the cells.

In the ceramic honeycomb structure 1 according to the embodiment shown in FIG. 5, in the partition walls (cell partition walls 2), a part located at least one opening end 5 of the cells of the cell group constitutes a reinforced partition wall part having higher strength than the normal partition wall part. Therefore, the ceramic honeycomb structure 1 according to the present invention has excellent erosion resistance.

The maximum difference in porosity of the reinforced partition wall part is within ±2%, in other words, high uniformity is achieved. Therefore, in the ceramic honeycomb structure 1 of the present embodiment, variation in chance of occurrence of erosion depending on the region of the reinforced partition wall part is very small, so that occurrence of local erosion phenomenon can be avoided. Accordingly, excellent erosion resistance is realized throughout the reinforced partition wall part.

In the ceramic honeycomb structure according to the present embodiment, the maximum difference in porosity among five regions of the reinforced partition wall part is preferably within ±1.5%, more preferably within ±1% from the view point of giving more excellent erosion resistance. In this context, the phrase "maximum difference in porosity of the reinforced partition wall part" concretely means a variation of porosity per unit volume among any five regions within the reinforced partition wall part.

In the present embodiment, the value of porosity (%) of the reinforced partition wall part is smaller than the value of porosity (%) of the normal partition wall part preferably by 3(%) or more, more preferably by 5(%) or more, and especially preferably by 8(%) or more. If the value of porosity (%) of the reinforced partition wall part is smaller than the value of porosity (%) of the normal partition wall part by less than 3(%), such case is unfavorable because sufficient erosion resistance is difficult to be exerted. Although the upper limit of the value by which the value of porosity (%) of the reinforced partition wall part is smaller than the value of porosity (%) of the normal partition wall part is not particularly restricted, but it should be generally 12(%) or less.

In the present embodiment, the porosity of the reinforced partition wall part is preferably not more than 30%, more preferably in the range of 13% to 25%, still preferably in the range of 15% to 23%, and most preferably in the range of 18% to 21% from the view point of achieving both the thermal shock resistance and the erosion resistance.

In the present embodiment, the minimum wall thickness of the partition walls is preferably in the range of 0.030 mm to 0.076 mm, and more preferably in the range of 0.030 mm to 0.065 mm. By defining the minimum wall thickness in such a range of value, it is possible to improve the emission control performance during warm-up by reducing the weight and heat capacity while reducing the pressure loss.

From the view point of achieving both the erosion resistance and small heat capacity, the reinforced partition wall part is disposed in a part or the whole of the range within 30 mm, more preferably within 10 mm in the axial direction from at least one end face of the opening end of the cells. Furthermore, in the ceramic honeycomb structure of the present embodiment, the reinforced partition wall parts may extend the same axial length from the end face of the opening end of the cells, however, it is preferred that the length from the end face of the opening end of the cells to the tip end of each reinforced partition wall part is not equal throughout the reinforced partition wall part, from the view point of achieving both the erosion resistance and small heat capacity, and restraining stress concentration at the boundary where the porosity changes.

In the present embodiment, it is preferred that the wall thickness of the reinforced partition wall part is larger than the wall thickness of the normal partition wall part. More specifically, the wall thickness of the reinforced partition wall part is preferably 1.20 to 4.00 times the wall thickness of the normal partition wall part. Also it is preferred from the view point of avoiding stress concentration that the wall thickness of the reinforced partition wall part decreases sequentially or stepwise in the axial direction from at least one end face of the opening end of the cells to transit to the wall thickness of the normal partition wall part. Various kinds of reinforced partition wall parts may be used singly or in combination of two or more kinds.

In the present invention, it is also preferable for improvement of erosion resistance that the cell walls 2*a* near the circumference of the honeycomb structure are made thick as shown in FIG. 6. By making the cell walls 2*a* near the circumference thick, it is also possible to improve isostatic strength as well as to increase holding strength in canning. Therefore, canning property can be improved. Here, "isostatic strength" is a strength obtained by a test conducted based on an automobile standard JASO M 505-87, and expressed by an applied pressure when breakage occurs. In FIG. 6, there are outermost peripheral cells 8 closest to the outer wall 4, and second cells 9 extend inwardly from the outermost peripheral cells 8. The wall thickness of the outermost peripheral cells is indicated by Tr1 and the wall thickness of the second cell 9 is indicated by Tr2. Any cell (not shown) of fifth to fifteenth cells is indicated by Tr5-15. Incidentally, cell walls 2 are largely divided into cell walls 2*a* near the circumference and basic cell walls 2*b*.

In the present embodiment, taking the outermost peripheral cell as a starting cell, taking any cell of the third to the twentieth cell located inwardly from the starting cell as an end cell and taking cells located inwardly from the end cell as basic cells, it is preferred that a relation between thickness (Tc) of partition walls forming the basic cells and each thickness (Tr1, Tr3-20) of partition walls forming the starting cell and the end cell is $1.10 \leq (Tr1, Tr3\text{-}20)/Tc \leq 3.00$. When this value [(Tr1, Tr3-20)/Tc] is less than 1.10, it does not contribute to improve erosion resistance and isostatic strength. Therefore it does not contribute to improve canning property. When the value is more than 3.00, heat capacity and pressure loss are increased. Further, when the partition wall thickness (Tr1, Tr2) of the first and the second cells is made large at a particular proportion, there is no improvement in erosion resistance or isostatic strength. When even the wall thickness of cells from first to over than twentieth cell, particularly to over than thirtieth cell are made large at a particular proportion, pressure loss are increased and carrier mass are increased by more than required, resultantly heat capacity is increased. Therefore, it is not preferred.

In the present embodiment, it is also preferred for practical application when heat capacity and pressure loss are taken into consideration that the relation between each partition wall thickness (Tr1, Tr3-20) and the basic cell wall thickness (Tc) is more restricted so as to be $1.10 \leq (Tr1, Tr3-20)/Tc \leq 2.50$, particularly $1.20 \leq (Tr1, Tr3-20)/Tc \leq 1.60$.

The ceramic honeycomb structure according to the present embodiment is made of at least one kind of ceramic selected from the group consisting of cordierite, alumina, mullite, silicon nitride, aluminum titanate, zirconia and silicon carbide, for example.

As the sectional shape of the ceramic honeycomb structure perpendicular to the channel in the present embodiment, there can be mentioned, for example, a circle, an ellipse, an oval, a trapezoid, a triangle, a tetragon, a hexagon or an asymmetry. Of these, a circle, an ellipse or an oval is preferred.

As a sectional shape of the cells perpendicular to the fluid channel in the ceramic honeycomb structure of the present embodiment, polygonal shapes having three or more vertexes, such as square, rectangle or hexagon can be exemplified. Of these, a triangle, a tetragon or a hexagon is preferred.

Figure 7:
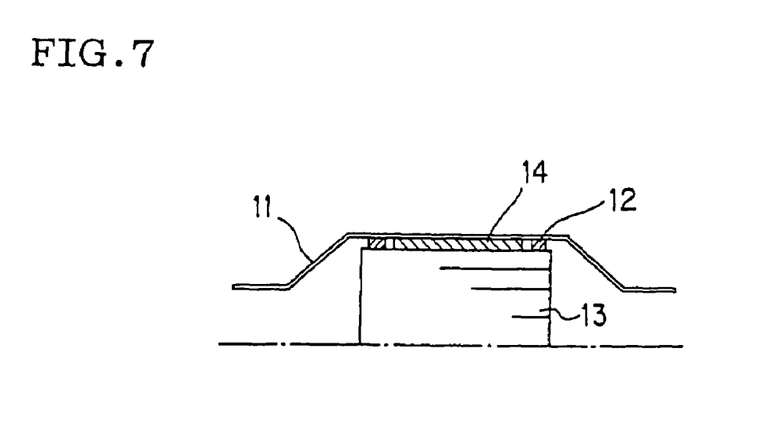
FIG. 7 is an explanatory view schematically showing an example in which the ceramic honeycomb structure of the present invention is incorporated into a converter container.

As to the application of the ceramic honeycomb structure of the present embodiment, there is no particular restriction. The honeycomb structure can be used in various applications such as various filters, a catalyst carrier and the like. The ceramic honeycomb structure is preferably used particularly for a carrier for purification of automobile exhaust gas. Also, the ceramic honeycomb structure of the present embodiment is preferably used by being accommodated in a catalytic converter case as shown in FIG. 7. In the Figure, the ceramic honeycomb structure 13 is accommodated in a converter case 11 by being held with the ring 12 at the outer surface. There is no particular restriction as to a material of the ring 12. A metallic mesh-made ring is used ordinarily. Between the converter case 11 and the outer surface of the ceramic honeycomb structure 13, a holding member 14 such as mat, cloth or the like is interposed preferably.

Next, description is made on an embodiment of the process for producing the ceramic honeycomb structure of the present invention. The method of producing the ceramic honeycomb structure of the present invention comprises the steps of obtaining a base material which is a unfired dry body of honeycomb structure having a plurality of partition walls using a kneaded compound based on a ceramic material, adhering a partition wall reinforcing agent to a part of partition wall located at least one of the opening ends of the cells in the base material, and firing the resultant base material, wherein as the partition wall reinforcing agent, a material based on a compound having at least one kind of atom selected from the group consisting of Si, Ti, Mg and Al in its structure is used.

In the present embodiment, since firing of the base material (normal partition wall part) and formation of the reinforced partition wall part can be simultaneously conducted, it is possible to improve the productivity and greatly reduce the product cost. Additionally, since the hydrophobic compound is used as the partition wall reinforcing agent, the water-soluble organic binder will not dissolve and swell when the partition wall reinforcing agent adheres to the partition walls, so that a ceramic honeycomb structure having desired performance can be obtained without causing deformation of the partition walls such as cell twisting.

Furthermore, in the present embodiment, since a compound having in its structure an atom contributing to reinforcement of partition wall is used as the partition wall reinforcing agent, the atom contributing to reinforcement of partition wall is usually located in a uniform manner in its physiochemical property. For this reason, it is possible to form a uniform reinforced partition wall part without taking a special measure such as dispersing, and to almost completely avoid an occurrence of local erosion. Therefore, even when the mean porosity is uniform throughout the reinforced partition wall part, it is possible to form a reinforced partition wall part having better erosion resistance than the conventional ceramic honeycomb structure. Furthermore, by using the above partition wall reinforcing agent, a product-to-product variation of erosion resistance is also eliminated. Therefore, it is possible to obtain a ceramic honeycomb structure having excellent erosion resistance more stably by a easier process. In the following, concrete explanation will be made for each step.

In the present embodiment, first a formed body of honeycomb structure having a plurality of partition walls is prepared using a kneaded compound based on a ceramic material.

In the present embodiment, the ceramic material is not particularly limited, and at least one selected from the group consisting of silicon carbide, boron carbide, titanium carbide, zirconium carbide, silicon nitride, boron nitride, aluminum nitride, alumina, zirconia, mullite, cordierite forming raw material, aluminum titanate and sialon can be used. The relationship with the partition wall reinforcing agent will be described later.

In the present embodiment, other additives may be contained in the kneaded compound as necessary. Examples of such additive include water-soluble organic binders, crystal growth auxiliary agents, dispersing agents and pore-forming agents. Examples of the water-soluble organic binders include hydroxypropylmethyl cellulose, methyl cellulose, hydroxyethyl cellulose, carboxylmethyl cellulose, polyvinyl alcohol and polyvinyl acetal. Examples of the crystal growth auxiliary agents include magnesia, silica, yttria and iron oxide, and examples of the dispersing agents include ethylene glycol, dextrin, fatty acid soap and poly alcohols. Examples of the pore-forming agents include graphite, wheat flour, starch, phenol resin and polyethylene terephthalate. These additives may be contained singly or in combination of two or more kinds depending on the particular object.

In the present embodiment, since the hydrophobic compound is used as the partition wall reinforcing agent as described above, the water-soluble organic binder will not dissolve and swell when the partition wall reinforcing agent is adhered to the partition wall, so that deformation of partition wall such as cell twisting will not occur. Therefore, the present embodiment is desirably applied to the production method in which the water-soluble organic binder is contained in the kneaded compound.

The kneaded compound may be prepared in a routine method, for example, by mixing a predetermined amount of water or the like into the ceramic material into which an additive such as water-soluble organic binder has been added, adding another additive as necessary, and kneading the resultant mixture using a kneader, pressure kneader or vacuum auger machine.

In the present embodiment, the method for obtaining a formed body of honeycomb structure (forming method) is not particularly restricted. However, from the view point of achieving excellent mass productivity, extrusion forming is preferred, and for example, extrusion forming using an extruder such as ram extruder or twin-screw extruder is preferred.

In the present embodiment, also the thickness of partition wall of the base material (wall thickness of normal partition wall part) is not particularly restricted. For instance, even with the base material having partition walls of 0.05 mm or less thick, a formed body having a desired honeycomb structure is obtained without causing deformation in the partition walls. Then the obtained formed body is dried to obtain a base material which is a dry body having a honeycomb structure. For drying the formed body, any suitable drying methods can be employed insofar as they will not substantially cause firing. Examples of the drying methods include the blast drying, hot air drying and microwave drying. In this context, "dry body" means an unfired dry body which is not substantially fired.

In the present embodiment, then prior to firing, the partition wall reinforcing agent is adhered to the plurality of partition walls located at the opening ends of the cells of the resultant base material (dry body).

At this time, according to the present embodiment, those based on the compounds having at least one atom in their structures, more specifically at least one atom selected from the group consisting of Si, Ti, Mg and Al that makes the partition walls located at the ends more close-grained by lowering the melting point of the base material forming material, or going into the fine pores in the partition walls to lower the volume of the fine pores are used as the partition wall reinforcing agent.

In the present embodiment, as the compound that is to be a basis of the partition wall reinforcing agent, compounds that generate inorganic oxides upon firing are preferred.

As the compound having Ti or Al in its structure, for example, aluminate alkoxy oligomers such as acetoalkoxy aluminum diisopropylate or titanate alkoxy oligomers used as a coupling agent are preferably used.

As the compound having Si in its structure, compounds having a siloxane bond, for example, silicone oil, silicon varnish, silicate alkoxy oligomer, mixtures thereof and the like are preferred.

Examples of the silicone oil include dimethyl silicone oil, methylphenyl silicone oil, methyl hydrogen silicone oil, amino-modified silicone oil, epoxy-modified silicone oil, carboxyl-modified silicone oil, carbinol-modified silicone oil, methacryl-modified silicone oil, mercapto-modified silicone oil, phenol-modified silicone oil, one end reactive silicone oil, different functional group-modified silicone oil, polyether silicone oil, methylstylyl-modified silicone oil, alkyl-modified silicone oil or higher fatty acid ester-modified.

In the present embodiment, the partition wall reinforcing agent may be prepared from one compound or mixture of two or more kinds selected from the compounds as exemplified above. It is especially preferred to prepare the partition wall reinforcing agent by mixing two or more kinds. When the partition wall reinforcing agent is prepared by mixing two or more kinds of the aforementioned compounds, it is possible to select and mix the above compounds having a variety of viscosities, and hence to adjust the viscosity of the partition wall reinforcing agent as desired. This facilitates uniform adhesion of the partition wall reinforcing agent. Also by arbitrarily selecting and mixing the above compounds, it is possible to arbitrarily control the degree of reinforcement of the partition walls while securing the desired thermal shock resistance. Therefore, it is possible to give desired corrosion resistance in accordance with the thickness of the partition wall or the like.

To be more specific, it is preferred to use the partition wall reinforcing agent prepared by mixing silicate alkoxy oligomer or methyl hydrogen silicon oil into dimethyl silicone oil, for example.

Furthermore, in such a partition wall reinforcing agent, the blending ratio of silicate alkoxy oligomer (SAO) or methyl hydrogen silicone oil (MHSO) to dimethyl silicone oil (DMSO) (SAO or MHSO/DMSO) is preferably from 10/90 to 75/25 (mass/mass), more preferably from 15/85 to 50/50 (mass/mass), and more preferably from 20/80 to 50/50 (mass/mass), especially preferably from 25/75 to 50/50 (mass/mass). When the blending ratio falls within these ranges, it is possible to obtain a ceramic honeycomb structure having excellent erosion resistance while ensuring desired thermal shock resistance.

Also, the partition wall reinforcing agent in the present embodiment may be the aforementioned compounds such as silicone oil, that are diluted in a diluent containing one or more than one selected from aromatic hydrocarbons such as toluene or xylene, aliphatic hydrocarbons such as petroleum ether or kerosene, petroleum-based hydrocarbons such as coal oil or diesel oil, alcohols such as isopropyl alcohol, lauryl alcohol or butanol, volatile silicone oils and so on. Addition of such a diluent makes it possible to arbitrarily control the degree of reinforcement of partition walls as well as to arbitrarily adjust the viscosity of the partition wall reinforcing agent, so that uniform adhesion of the partition wall reinforcing agent is achieved more easily.

In the present embodiment, the partition wall reinforcing agent has an absolute viscosity of preferably from 1 to 10000 mPa·s, and more preferably from 10 to 1000 mPa·s.

In general, a compound having low viscosity is small in degree of polymerization and tends to volatilize easily. If the viscosity is less than 1 mPa·s, when the compound adhered to the partition walls is fired, Si or the like active ingredient existing in the partition wall reinforcing agent volatilizes together with $CO_2$ and $H_2O$, so that it becomes difficult to form a rigid reinforced partition wall part. To the contrary, if the viscosity is more than 10000 mPa·s, the partition wall reinforcing agent is difficult to be adhered to the partition walls at uniform thickness.

Furthermore, preferably, the partition wall reinforcing agent in the present embodiment is suitably selected for each kind of ceramic material. For example, in the case of a kneaded compound based on a cordierite forming raw material, compounds having Si in their structures such as silicon oil are preferably selected.

In the present embodiment, when the partition wall reinforcing agent is adhered to the partition walls, by dipping the base material in the partition wall reinforcing agent from the end face of the opening end of the cells to a predetermine height, it is possible to readily and uniformly adhere the partition wall reinforcing agent to all the partition walls. This procedure is ideal in that the region where the reinforced partition wall part is to be provided can be easily and arbitrarily controlled. In order to adhere the partition wall reinforcing agent uniformly, however, it is preferred to remove the partition wall reinforcing agent having excessively adhered after the dipping by compressive air or the like. Spray application can also be used for achieving uniform application of the partition wall reinforcing agent, however, with the spray application, it is difficult to arbitrarily control the region where the reinforced partition wall part is to be provided.

Next, in the present embodiment, the base material to which the partition wall reinforcing agent has adhered is subjected to at least one firing to simultaneously conduct firing (formation) of the normal partition wall part and firing (formation) of the reinforced partition wall part.

In the present embodiment, it is preferred to dry the base material and the partition wall reinforcing agent in advance of the firing step, and examples of the drying method include blast drying, hot air drying and microwave drying.

As for the firing condition, it is preferred to arbitrarily select a desired condition depending on the kinds of the base material and the partition wall reinforcing agent. For example, in the case where the base material is based on a cordierite forming raw material and the partition wall reinforcing agent is based on a compound having Si in its structure such as silicone oil, the firing may be conducted at 1300 to 1500° C.

In the above description, the production method according to the present embodiment was explained step by step. With the production method of the present embodiment, it is possible to produce a ceramic honeycomb structure having excellent erosion resistance stably by a single firing step without causing deformation or the like in the partition walls, while achieving high productivity and great reduction of the product cost.

The present invention is described more specifically below by way of Examples. However, the present invention is in no way restricted by these Examples.

EXAMPLE 1

To 100 parts by mass of a ceramic material comprising a cordierite forming raw material, 8 parts by mass of methylcellulose, 0.5 part by mass of potassium laurate soap, 2 parts by mass of polyether and 28 parts by mass of water were mixed, and the resultant mixture was loaded to a continuous extruder to obtain a formed body having a honeycomb structure. This formed body was dried to obtain a base material (unfired dry body) having a honeycomb structure.

Then the obtained base material was dipped in a partition wall reinforcing agent comprising dimethyl silicone oil (manufactured by Shin-Etsu Chemical Co., Ltd. under the trade name of KF96-100CS, absolute viscosity: about 100 mPa·s) at a depth of 5 mm in the axial direction from the opening end of the cells, to allow partition wall reinforcing agent to adhere the partition walls located at the opening end of the cells of the base material. Immediately after that, compressed air at room temperature was fed to remove the partition wall reinforcing agent that was adhered in excess.

Next, the base material having a honeycomb structure bearing the partition wall reinforcing agent adhered to the partition walls located at the opening end of the cells was fired at 1400° C. for four hours to produce a cylindrical ceramic honeycomb structure (not bearing catalyst) having a partition wall thickness of 0.064 mm, diameter of 100 mm and height of 100 mm with square cells in the density of 140 cells/cm$^2$, and having a porosity of 85.5%. The porosity of the normal partition wall part of the produced ceramic honeycomb structure was from 27 to 28%.

EXAMPLES 2 TO 4

A ceramic honeycomb structure was prepared in the same manner as described in Example 1 except that as the partition wall reinforcing agent, methyl hydrogen silicone oil (manufactured by Shin-Etsu Chemical Co., Ltd. under the trade name of KF99, absolute viscosity: about 20 mPa·s) and dimethyl silicone oil (manufactured by Shin-Etsu Chemical Co., Ltd. under the trade name of KF96L-0.65CS, absolute viscosity: about 0.65 mPa·s) blended in the ratios (mass/mass) of 10/90, 25/75 and 50/50 were respectively used.

EXAMPLES 5 TO 7

A ceramic honeycomb structure was prepared in the same manner as described in Example 1 except that as the partition wall reinforcing agent, silicate alkoxy oligomer (manufactured by Shin-Etsu Chemical Co., Ltd. under the trade name of KR-500, absolute viscosity: about 20 mPa·s) and dimethyl silicone oil (manufactured by Shin-Etsu Chemical Co., Ltd. under the trade name of KF96L-0.65CS, absolute viscosity: about 0.65 mPa·s) blended in the ratios (mass/mass) of 10/90, 25/75 and 50/50 were respectively used.

EXAMPLES 8 TO 10

A ceramic honeycomb structure was prepared in the same manner as described in Example 1 except that as the partition wall reinforcing agent, methyl hydrogen silicone oil (manufactured by Shin-Etsu Chemical Co., Ltd. under the trade name of KF99, absolute viscosity: about 20 mPa·s) and dimethyl silicone oil (manufactured by Shin-Etsu Chemical Co., Ltd. under the trade name of KF96L-1000CS, absolute viscosity: about 1000 mPa·s) blended in the ratios (mass/mass) of 10/90, 25/75 and 50/50 were respectively used.

EXAMPLE 11

A ceramic honeycomb structure was prepared in the same manner as described in Example 1 except that as the partition wall reinforcing agent, methyl hydrogen silicone oil (manufactured by Shin-Etsu Chemical Co., Ltd. under the trade name of KF99, absolute viscosity: about 20 mPa·s) and coal oil (manufactured by Nisseki Mitsubishi Co., Ltd.) blended in the ratio (mass ratio) of 25/75 were used.

COMPARATIVE EXAMPLE 1

A honeycomb structure was prepared in the same manner as described in Example 1 except that a partition wall reinforcing agent is not adhered to the base material having a honeycomb structure.

COMPARATIVE EXAMPLE 2

A ceramic honeycomb structure was prepared in the same manner as described in Example 1 except that as the partition wall reinforcing agent was used a dispersion prepared by adding 0.5 parts by mass of dispersing agent (alkyl acetalized polyvinyl alcohol, manufactured by SEKISUI CHEMICAL CO., LTD. under the trade name of S-LEC KW-3) to 100 parts by mass of a dispersion of 5% by mass of silica (SiO$_2$) powder in water serving as a dispersing medium.

COMPARATIVE EXAMPLE 3

A ceramic honeycomb structure was prepared in the same manner as described in Example 1 except that as the partition wall reinforcing agent was used a dispersion prepared by adding 0.5 parts by mass of dispersing agent (polyoxyalkylene group polymer, manufactured by NOF CORPORATION under the trade name of MALIALIM AKM-0531) to 100 parts by mass of a dispersion of 5% by mass of silica (SiO$_2$) powder in petroleum-based hydrocarbon (manufactured by Nisseki Mitsubishi Co., Ltd., coal oil/CRISEF oil (trade name) F8 mixture, main component: coal oil) serving as a dispersing medium.

The ceramic honeycomb structure obtained in each of Examples and Comparative Examples was examined for porosity, erosion resistance, isostatic strength and thermal shock resistance in the manner as described below.

1. Porosity 1 (Product-to-Product Difference)

Figure 1:
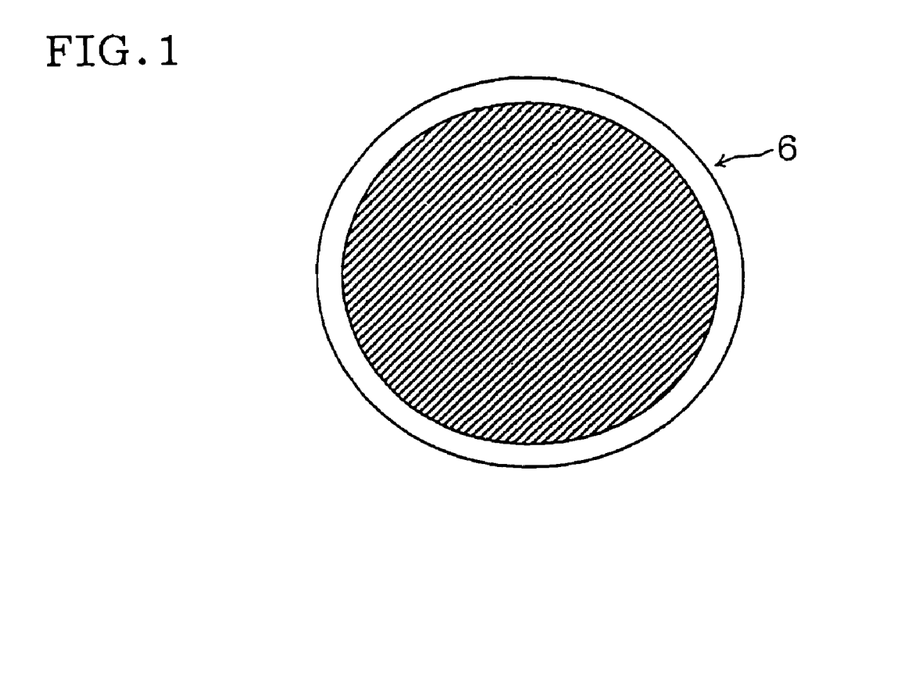
FIG. 1 is a schematic view showing the region sampled for determining Porosity 1 (product-to-product difference) for ceramic honeycomb structural bodies according to each Examples and each Comparative Examples.

In five ceramic honeycomb structural bodies obtained in each of Examples and Comparative Examples, as shown in FIG. 1, a measuring sample 6 was cut out in an area of 70 cm² which is almost the whole area of the end face in the reinforced partition wall part, and porosity of each measuring sample was measured, and the maximum difference was determined in the manner as described below.

2. Porosity 2 (Uniformity of Reinforced Partition Wall Part)

Figure 2:
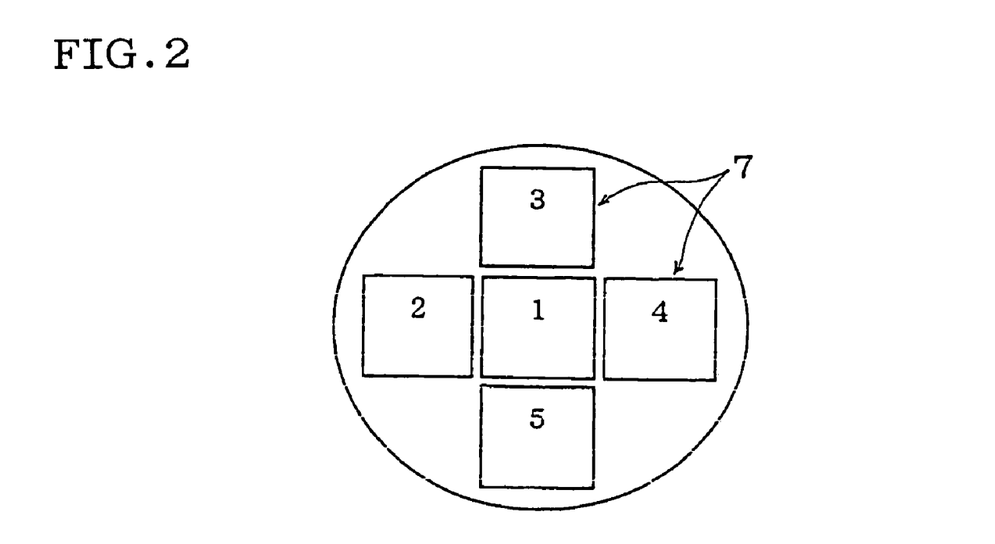
FIG. 2 is a schematic view showing the region sampled for determining Porosity 2 (uniformity of reinforced partition wall part) for ceramic honeycomb structural bodies according to each Examples and each Comparative Examples.

To examine whether the erosion resistance is uniform throughout the reinforced partition wall part, as shown in FIG. 2, for the reinforced partition wall part of one ceramic honeycomb structure obtained in each of Examples and Comparative Examples, measuring samples 7 having an area of 9 cm² were cut out at the total of five regions including one center region and four peripheral regions in the end face, and porosity of each measuring sample was measured, and the maximum difference was determined in the manner as described below.

3. Measurement of Porosity (1) The sample was dried at 150 degree C. for 2 hours and placed in a container. The container was set in a tester.

(2) Mercury was injected into the container. A pressure corresponding to a predetermined pore diameter was applied. The volume of mercury absorbed by the sample was measured.

(3) Pore distribution was calculated from the applied pressure and the volume of mercury absorbed.

(4) Pore volume was calculated from the volume of mercury absorbed by applying a pressure of 68.6 MPa (700 kgf/cm2).

(5) Porosity was determined from a total pore volume using the following formula.

Porosity (%)=total pore volume (per g)×100/[total pore volume (per g)+1/2.52]

4. Erosion Resistance

Figure 8:
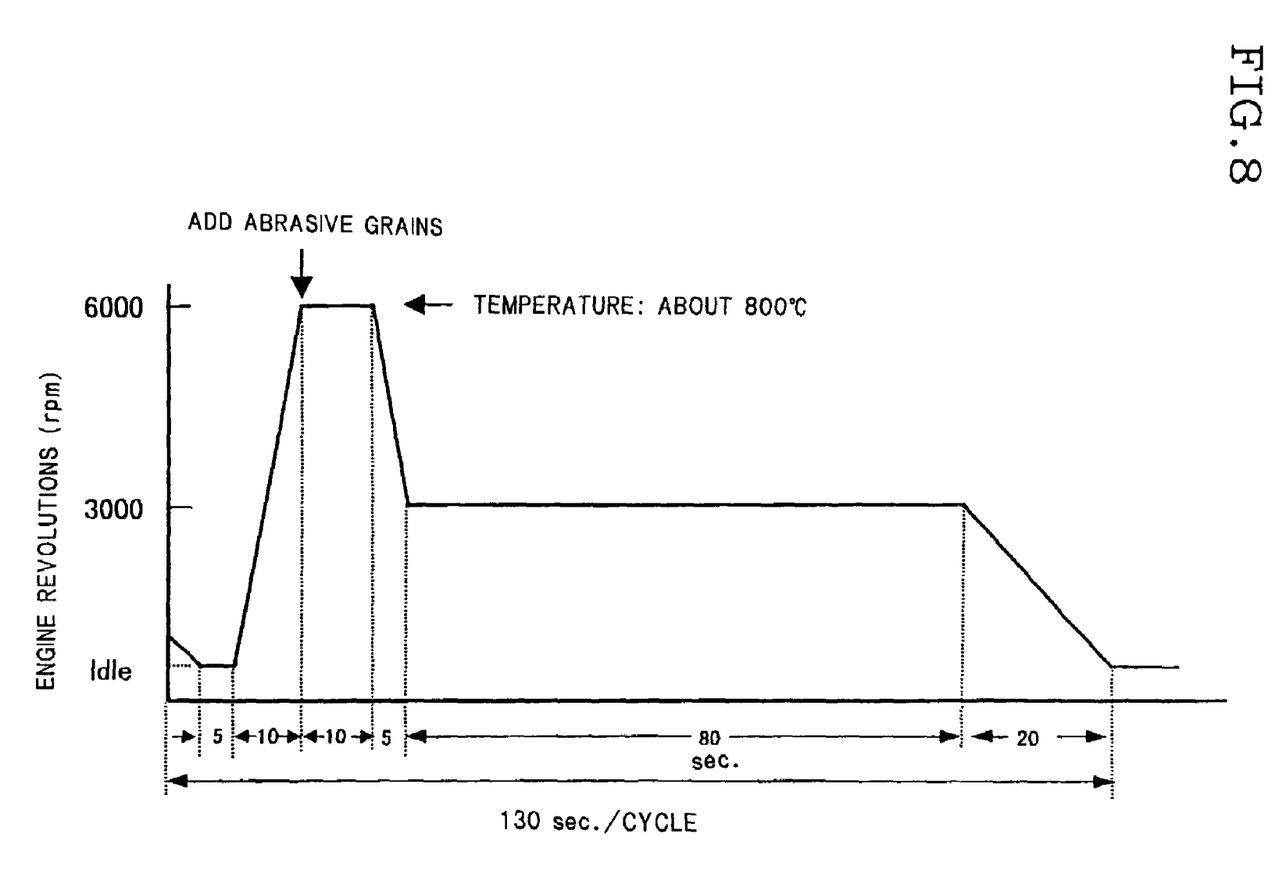
FIG. 8 is a view showing the condition of the engine revolutions in the erosion test.

A metallic can holding and accommodating a ceramic honeycomb structure was connected to the exhaust port of a gasoline engine of in-line four cylinders and 1.8 liters displacement. That is, a sample was placed right near the engine. Next, the engine was operated under the conditions shown in FIG. 8 and, when the engine revolutions reached 6,000 rpm, 0.1 g of abrasive grains (silicon carbide, GC 320, average particle diameter: 50 im) were added. Further, the engine operation was continued under the conditions shown in FIG. 8; once in each two cycles (one cycle: 130 seconds), abrasive grains were added; this was repeated continuously. Test was conducted several times by changing the total amount of abrasive grains added between about 2 g and 16 g, and from the results was calculated the erosion amount (wind erosion volume) of the ceramic honeycomb structure when the amount of abrasive grains added was 10 g.

Figure 9:
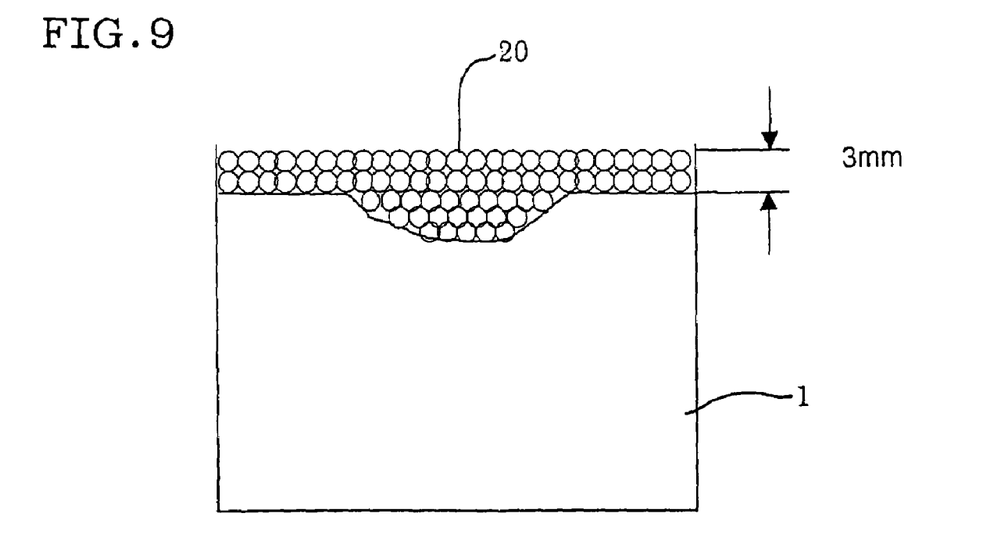
FIG. 9 is an explanatory view schematically showing a method of determining an erosion amount.

Erosion amount was measured by, as shown in FIG. 9, winding a rubber sheet round the end face of a ceramic honeycomb structure 1 whose erosion amount was to be measured, placing therein ceramic-made beads of 1.5 mm in diameter at a height of about 3 mm, then recovering them to measure the volume of beads, and calculating a difference between beads volume after erosion test and beads volume before the test. This was conducted three times and an average thereof was taken as erosion amount. Evaluation was made on three ceramic honeycomb structural bodies obtained in each of Examples and Comparative Examples. When the erosion amount exceeds 3 cc in all the three samples, the symbol "×" was given representing unendurability to practical use. When both the erosion amount of 2 cc or less and the erosion amount exceeding 3 cc are observed, the symbol "Δ" was given; when all of the erosion amounts fall within the range of 2 to 3 cc, the symbol "○" was given; and when all of the erosion amounts are less than 2 cc, the symbol "◎" was given.

5. Isostatic Strength

A test based on an automobile standard JASO M 505-87 was conducted to measure a value of applied pressure when breakage occurs. The value represents isostatic strength (kg/cm²).

6. Thermal Shock Resistance

After heating the ceramic honeycomb structure to a predetermined temperature in an electric furnace, the ceramic honeycomb structure was taken out and placed in room temperature atmosphere of 20° C., and whether defects such as cracking occurred due to thermal shock were visually checked both in the elevated temperature condition immediately after taking out the ceramic honeycomb structure, and in the condition after cooling by cold air (the condition at 20° C.). When no defect was observed, the heating temperature was further elevated, and the test was repeated until some defect occurred. The temperature at which the defect occurred was determined to evaluate the thermal shock resistance.

(Evaluation)

In the production method according to Comparative Example 1 in which no partition wall reinforcing agent is used, all of the five obtained ceramic honeycomb structural bodies have large porosity of 27 to 28%, which demonstrated that the ceramic honeycomb structure is unendurable to practical use in respect of the erosion resistance.

Figure 4:
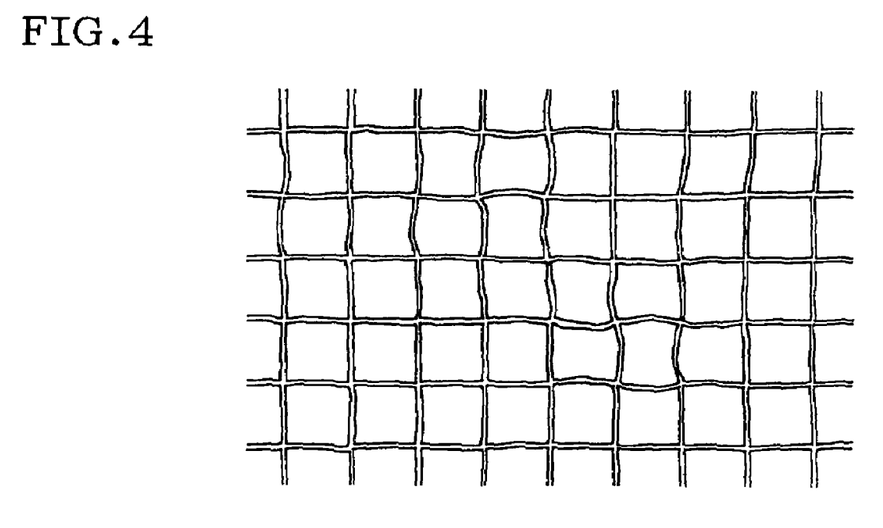
FIG. 4 is an enlarged view showing a condition of a part of the partition walls in the ceramic honeycomb structure obtained by the production method of Comparative Example 2.

In the production method according to Comparative Example 2 in which a dispersion of silica ($SiO_2$) powder in water was used as the partition wall reinforcing agent, as shown in FIG. 4, significant deformation that is visible to the naked eye was observed in the partition walls of the obtained ceramic honeycomb structure, and any of the obtained five ceramic honeycomb structural bodies showed an isostatic strength of as small as 3 to 5 kg/cm², which is unendurable to practical use. In addition, the maximum difference in mean porosity in the reinforced partition wall part among the five ceramic honeycomb structural bodies was 5%. Also the erosion resistances largely varied among the products in the range of 1.2 to 3.2 cc. Taking one ceramic honeycomb structure, the maximum difference in porosity was as large as 5%, so that a local erosion phenomenon is more likely to occur compared to the ceramic honeycomb structure obtained in Example as will be described later. This suggests that when the mean porosity is uniform throughout the reinforced partition wall part, the erosion resistance is smaller.

Likewise, in the production method according to Comparative Example 3 in which a dispersion of silica ($SiO_2$) in a petroleum-based hydrocarbon is used as the partition wall reinforcing agent, the maximum difference in mean porosity of the entire reinforced partition wall part among the obtained five ceramic honeycomb structural bodies was 8%, and the erosion resistance more largely varied among the products in the range of 1.1 to 3.5 cc. The maximum difference in porosity in one ceramic honeycomb structure increased to 7%, suggesting that a local erosion phenomenon is more likely to occur in the reinforced partition wall part.

Figure 3:
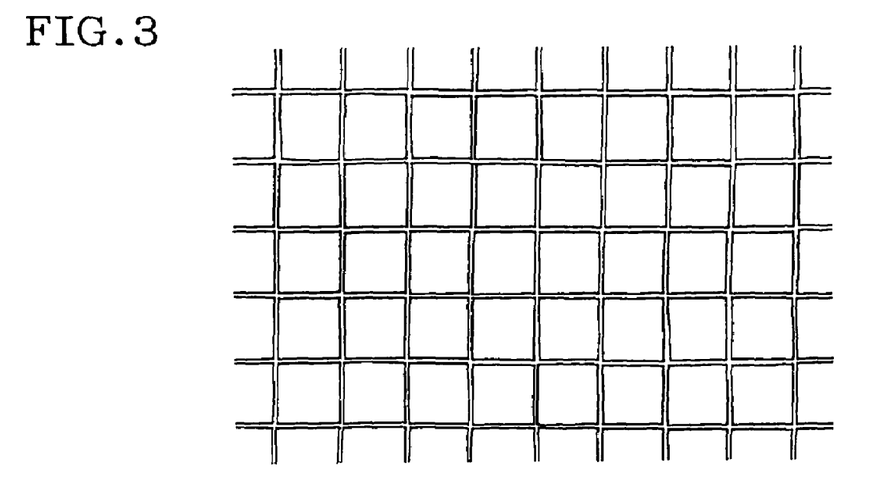
FIG. 3 is an enlarged view showing a condition of a part of the partition walls in the ceramic honeycomb structure obtained by the production method of Example 1.

To the contrary, in the production methods according to Examples in which the partition wall reinforcing agent comprising a compound having Si in its structure is adhered to the partition wall, as shown in FIG. 3 (FIG. 3 shows a ceramic honeycomb structure obtained in Example 1), no deformation was observed in the partition walls, and isostatic strength of not less than 21 kg/cm$^2$ which is completely acceptable to practical use was achieved. Furthermore, the entire reinforced partition wall part had a mean porosity in the range of 14 to 24%, which is lower by 3 to 13% than that of the unreinforced part, suggesting that erosion resistance is increased. It was also confirmed that the maximum difference in mean porosity of the entire reinforced partition wall part among the five ceramic honeycomb structural bodies was 1%, representing very small variation, and that the erosion resistance was not more than 3 cc in every case. Also in one ceramic honeycomb structure, the reinforced partition wall part was uniformly formed as is apparent from the maximum difference in porosity of not more than 1%. This suggests that a local erosion phenomenon is not likely to occur in the reinforced partition wall part, and the erosion resistance is improved in the entire reinforced partition wall part.

In the production methods according to Examples 2 to 4 and Examples 8 to 10 in which a partition wall reinforcing agent prepared by mixing methyl hydrogen silicone oil and dimethyl silicone oil was adhered to the partition walls, the production methods according to Examples 5 to 7 in which a partition wall reinforcing agent prepared by mixing silicate alkoxy oligomer and dimethyl silicone oil was adhered to the partition walls, and the production method according to Example 11 in which a partition wall reinforcing agent prepared by mixing methyl hydrogen silicone oil and coal oil was adhered to the partition walls, it was found the mean porosity of the entire reinforced partition wall part tends to decrease as the content of methyl hydrogen silicone oil or silicate alkoxy oligomer increases.

More specifically, in the ceramic honeycomb structural bodies obtained in Examples 3, 4, 6, 7 and 9-11 in which the content of methyl hydrogen silicone oil or silicate alkoxy oligomer was 25% or more, a reinforced partition wall part having a mean porosity of not more than 21% was obtained, and a very large erosion resistance was realized partly because of the effect of having uniform porosity. Furthermore, in the ceramic honeycomb structural bodies obtained in Examples 4, 7 and 10 in which the content of methyl hydrogen silicone oil or silicate alkoxy oligomer was 50%, the reinforced partition wall part had a mean porosity of 14-15%, 16-17% and 14-15%, respectively, and erosion resistance was still larger. It should be noted that in any of Examples and Comparative Examples, the obtained ceramic honeycomb structure exhibited a thermal shock resistance temperature of 700° C. or higher, which is practically sufficient thermal shock resistance. Table 1 shows the used partition wall reinforcing agents and the evaluation results.

TABLE 1

| | Partition wall reinforcing agent | Blending ratio (mass/mass) | Isostatic strength (kg/cm$^2$) (n5) | Erosion resistance (n3) | Porosity of reinforced partition wall part (%) | | Thermal shock resistance (Limit temperature (° C.)) |
|---|---|---|---|---|---|---|---|
| | | | | | Product-to-product difference (n5) (Mean porosity of reinforced partition wall part) | Uniformity of reinforced partition wall part (n1) (Between center part and peripheral parts) | |
| Example 1 | DMSO*$^1$ | 100 | 23~25 | ○ (2.4~2.7 CC) | 1%(23~24) | 1%(23~24) | 800 |
| Example 2 | MHSO*$^2$/DMSO | 10/90 | 21~24 | ○ (2.1~2.5 CC) | 1%(22~23) | 1%(22~23) | 800 |
| Example 3 | MHSO/DMSO | 25/75 | 22~25 | ◎ (1.0~1.3 CC) | 1%(18~19) | 0%(19~19) | 750 |
| Example 4 | MHSO/DMSO | 50/50 | 24~27 | ◎ (0.4~0.6 CC) | 1%(14~15) | 1%(14~15) | 700 |
| Example 5 | SAO*$^3$/DMSO | 10/90 | 25~26 | ○ (2.4~2.8 CC) | 1%(23~24) | 0%(23~23) | 800 |
| Example 6 | SAO/DMSO | 25/75 | 22~26 | ◎ (1.5~1.9 CC) | 1%(20~21) | 0%(20~20) | 750 |
| Example 7 | SAO/DMSO | 50/50 | 21~25 | ◎ (0.5~0.9 CC) | 1%(16~17) | 1%(16~17) | 750 |
| Example 8 | MHSO/DMSO | 10/90 | 23~25 | ○ (2.1~2.3 CC) | 1%(21~22) | 0%(21~21) | 800 |
| Example 9 | MHSO/DMSO | 25/75 | 23~25 | ◎ (1.0~1.5 CC) | 1%(18~19) | 0%(19~19) | 800 |
| Example 10 | MHSO/DMSO | 50/50 | 21~26 | ◎ (0.6~0.9 CC) | 1%(14~15) | 0%(15~15) | 750 |
| Example 11 | MHSO/COAL OIL | 25/75 | 21~22 | ◎ (1.2~1.9 CC) | 1%(19~20) | 1%(19~20) | 750 |
| Comparative Example 1 | — | — | 21~25 | X (4.0~4.7 CC) | 1%(27~28) | 0%(27~27) | 800 |
| Comparative Example 2 | SiO$_2$ powder/H$_2$O | 5/95 | 3~5 | Δ (1.2~3.2 CC) | 5%(20~25) | 5%(21~26) | 750 |
| Comparative Example 3 | SiO$_2$ powder/HC | 5/95 | 21~25 | Δ (1.1~3.5 CC) | 8%(18~26) | 7%(17~24) | 750 |

*$^1$DMSO: Dimethyl silicone oil
*$^2$MHSO: Methyl hydrogen silicone oil
*$^3$SAO: Silicate alkoxy oligomer

INDUSTRIAL APPLICABILITY

As explained above, according to the present invention, it is possible to obtain a honeycomb structure having desired performance without causing any deformation or the like in partition walls while dramatically improving the productivity and achieving cost reduction.

Additionally, it is possible to accurately form a sophisticated and uniform reinforced partition wall part, and to stably obtain a ceramic honeycomb structure having excellent erosion resistance. Of course, the obtained ceramic honeycomb structure has greatly uniformed porosity throughout the reinforced partition wall part, and hence has more excellent erosion resistance because local erosion phenomenon is avoided almost completely.

The invention claimed is:
1. A ceramic honeycomb structure comprising:
a cell group having cells, the cells being divided each other by porous partition walls and functioning as a fluid channel; and a porous outer wall surrounding and holding outermost peripheral cells located at a circumference of the cell group, wherein in the partition walls, a part located at at least one opening end of the cells of the cell group constitutes a reinforced partition wall part having higher strength than the other part of the partition walls as well as having a variation of porosity per unit volume within ±2%.

2. The ceramic honeycomb structure according to claim 1, wherein the value of porosity (%) of the reinforced partition wall part is smaller than the value of porosity (%) of the normal partition wall part by 3(%) or more.

3. The ceramic honeycomb structure according to claim 1, wherein porosity of the reinforced partition wall is 30% or less.

4. The ceramic honeycomb structure according to claim 1, wherein the minimum partition wall thickness of the partition walls is in the range of 0.030 to 0.076 mm.

5. The ceramic honeycomb structure according to claim 1, wherein the length from the end face of the opening end of the cells to a tip end of each reinforced partition wall part is not uniform throughout the reinforced partition wall part.

6. The ceramic honeycomb structure according to claim 1, wherein the partition wall thickness of the reinforced partition wall part is larger than the partition wall thickness of the normal partition wall part.

7. The ceramic honeycomb structure according to claim 1, wherein taking the outermost peripheral cell as a starting cell, taking any cell of the third to the twentieth cell located inwardly from the starting cell as an end cell and taking cells located inwardly from the end cell as basic cells, a relation between thickness (Tc) of partition walls forming the basic cells and a thickness of the starting cell (Tr1) of partition walls forming the starting cell and the end cell is $1.10 \leq Tr1/Tc \leq 3.00$, and the relation between thickness (Tc) of partition walls forming the basic cells and the thickness of any cell of the third to the twentieth cell (Tr3-20) located inwardly from the starting cell, of partition walls forming the starting cell and the end cell is $1.10 \leq (Tr3-20)/Tc \leq 3.00$.

8. The ceramic honeycomb structure according to claim 1, comprising at least one kind of ceramic selected from the group consisting of cordierite, alumina, mullite, silicon nitride, aluminum titanate, zirconia and silicon carbide.

9. The ceramic honeycomb structure according to claim 1, wherein a sectional shape of the honeycomb structure perpendicular to the channel is circular, elliptic, oval, trapezoidal, triangular, tetragonal, hexagonal or asymmetric.

10. The ceramic honeycomb structure according to claim 1, wherein the sectional shape of the honeycomb structure perpendicular to the channel is triangular, tetragonal or hexagonal.

11. The ceramic honeycomb structure according to claim 1, used as a carrier of catalyst for automobile exhaust gas emission control.

12. The ceramic honeycomb structure according to claim 1, incorporated into a catalyst converter in such a manner that the partition walls bear a catalyst component and the ceramic honeycomb structure is held at the outer circumference of the outer wall.

* * * * *